United States Patent [19]

Champlin

[11] Patent Number: 5,013,053
[45] Date of Patent: May 7, 1991

[54] UNIVERSAL SEAL CAGE LANTERN RING WITH DOUBLE-SIDED SLOTTED LAND STRUCTURE

[75] Inventor: George B. Champlin, Stoneham, Mass.

[73] Assignee: New England Braiding Company, Inc., Manchester, N.H.

[21] Appl. No.: 358,162

[22] Filed: May 26, 1989

[51] Int. Cl.$^5$ .............................................. F16J 15/18
[52] U.S. Cl. ..................................... 277/215; 277/59; 277/139
[58] Field of Search .................. 277/215, 52, 200, 201, 277/138, 139, 59

[56] References Cited

U.S. PATENT DOCUMENTS

| | | | |
|---|---|---|---|
| 3,768,818 | 10/1973 | Minegishi | 277/139 |
| 3,834,715 | 9/1974 | Butler | 277/59 |
| 4,270,760 | 6/1981 | Greiman | 277/74 |
| 4,498,681 | 2/1985 | Heinz | 277/215 |
| 4,749,203 | 6/1988 | Bright | 277/184 |

Primary Examiner—Allan N. Shoap
Assistant Examiner—D. G. DePumpo
Attorney, Agent, or Firm—Robert K. Tendler

[57] ABSTRACT

A universal seal cage lantern ring (USCLR) is provided with a slotted land type structure on both sides of a flexible central web, with the USCLR being constructed in a continuous undefined length, so that lantern rings can be cut to size therefrom, with the USCLR being adapted to wrap around a shaft so as to form a single complete ring around any given size shaft for which it is cut. The structure resembles an I-beam in which the I-beam flanges have been transversely slotted on both sides of the central web. When used for small diameter shafts, this structure prevents fracture or snapping of the ring due to the flexibility of the central web and the slots between lands on both sides of the ring. For larger diameter shafts, lantern ring rotation is minimized because portions of the packing rings adjacent the lantern ring protrude into the slots between adjacent outer lands, thus locking the packing rings adjacent the lantern ring and the lantern ring together, which increases frictional contact of the assembly with the stuffing box bore and prevents rotation. Moreover, the slot structure of the outside lands permits quick non-destructive removal of the lantern ring by a corkscrew type packing puller tool, since the corkscrew tip when inserted into the stuffing box tends to run along the interior wall of the stuffing box and engages an exterior slot between adjacent lands outside of the lantern ring, facilitating ring removal.

5 Claims, 3 Drawing Sheets

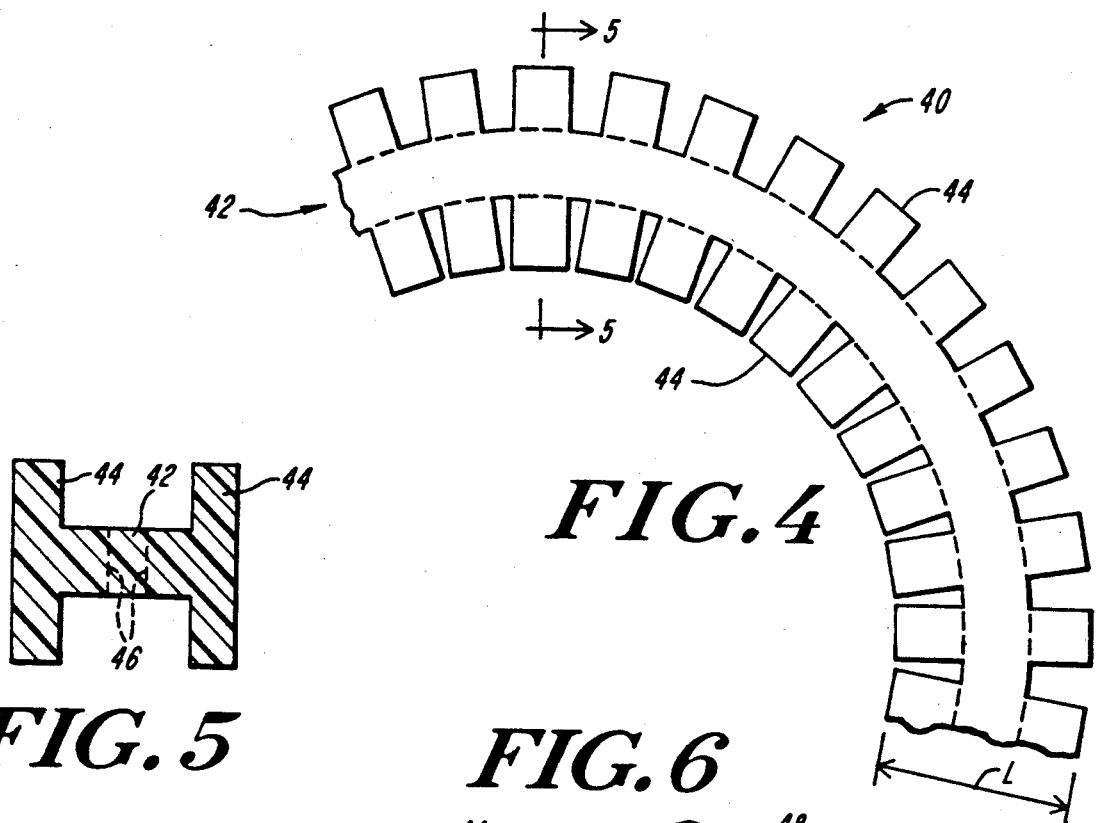
FIG. 4
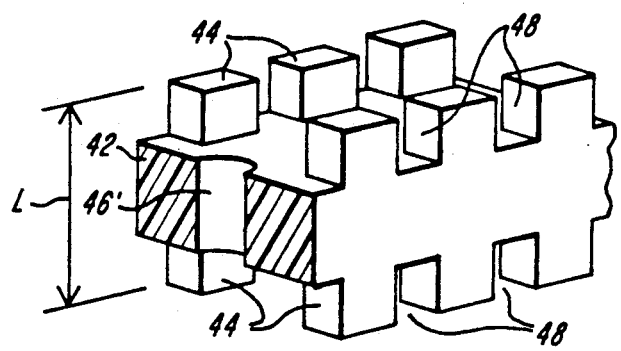
FIG. 5　　FIG. 6
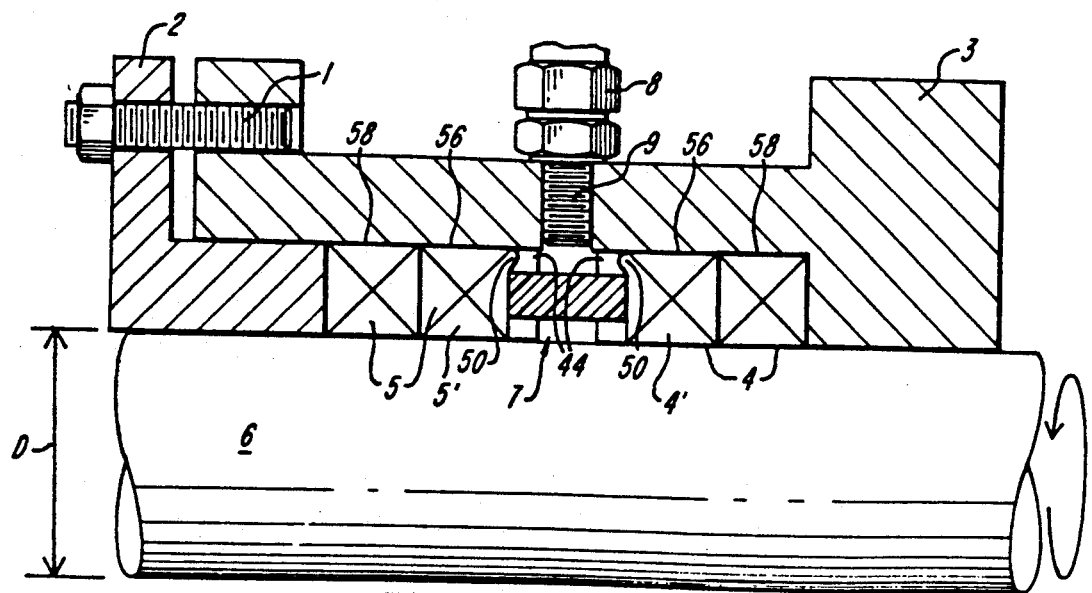
FIG. 7

UNIVERSAL SEAL CAGE LANTERN RING WITH DOUBLE-SIDED SLOTTED LAND STRUCTURE

FIELD OF INVENTION

This invention relates to the sealing of a shaft with packing material and more particularly to a flexible lantern ring which may be cut to an appropriate length and wrapped around a shaft, with the lantern ring being designed to prevent breakage when used in small diameter shaft applications, and being designed to limit ring rotation in large diameter shaft applications.

BACKGROUND OF THE INVENTION

As discussed in U.S. Pat. No. 4,498,681 issued Feb. 12, 1985 to Larry Heinz and incorporated herein by reference, a universal seal cage lantern ring, USCLR, is illustrated which provides for a flexible web, in which lands to one side of the web are formed in a continuous integral manner such that the lands to one side of the web form a continuous channel. The lands to the other side of the web are slotted to provide an intermittent land structure; and the web is provided with apertures through which fluid flows from the outer portion of the lantern ring to the inner channel where it may be dispersed about the shaft. Note, other U.S. Patents, namely U.S. Pat. Nos. 1,532,961; 501,207; 4,157,833; 1,514,192; and 1,653,439 illustrate various lantern ring configurations.

More particularly, with respect to U.S. Pat. No. 4,498,681 there has been some difficulty with snapping of lantern rings made with continuous lands when such a lantern ring is made from polytetrafluoroethylene, PTFE, and is formed to fit about a relatively small diameter shaft with the continuous land structure installed to the inside of the ring. The reason attributable to the breakage of the lantern ring is that the continuous land structure is relatively rigid and is not elastic enough to deform when wrapped around a small shaft. This results in the snapping of the lantern ring when forming the ring about a small radius. Even if the lantern ring does not break at this time it may fracture, such that when it is placed in a stuffing box and sequentially installed with packing rings, the installed lantern ring may break at the fracture point during the tightening of the gland.

Since there are large numbers of applications involving small diameter shafts, less than 1½" in diameter, and since snapping of the lantern rings is extremely costly, especially where as many as 3,000 pumps in a single plant may be involved, the ability to provide a reusable ring from a roll which will survive rough handling offers considerable cost savings.

Moreover, when, as directed, such a lantern ring structure is wound about a shaft with the intermittent lands adjacent the shaft, removal of such a packing ring is difficult when utilizing a corkscrew type packing puller, as is common in the industry. This is because the corkscrew point usually digs into the continuous land when it is screwed into the lantern ring for the purpose of its removal. The reason that the point digs into the continuous land is because the corkscrew tends to run down the wall or the bore of the surrounding stuffing box, such that the point of the corkscrew meets up with the continuous land and screws into it. When the corkscrew pulls out the lantern ring during removal, the continuous land breaks as the lantern ring is pulled out.

Additionally, for large diameter shafts, normally in excess of 3 1/2 inches in diameter, the aforementioned lantern ring tends to rotate with the shaft if any contact is made with the shaft. This occurs unless there is clearance between shaft and lantern ring assured by measurement; or unless sufficient frictional Pressure is provided between the packing adjacent the lantern ring and the lantern ring itself. In the modern climate of haste to bring equipment back on line, both steps to prevent rotation are increasingly lacking. It will be appreciated that lantern ring rotation results in wear which promotes leakage. In the past, for large diameter shafts, the user was directed to use the Heinz ring with the continuous lands on the outside of the ring. This prevented packing rings on either side of the lantern ring from locking into the lantern ring, which would have prevented lantern ring rotation. Note also that for large diameter shafts, the shaft surface is within a few percent of the stuffing box bore surface, so that in normal usage, lantern rings tend to rotate with the large diameter shaft whenever shaft to lantern ring contact occurs.

SUMMARY OF THE INVENTION

The problems with the snapping of the prior lantern ring, lantern ring rotation, and the inability to remove the lantern ring undamaged is solved by providing an I-beam shaped ring with slotted lands on both sides of the web. While the slots in the lands provide for the distribution of the fluid to the adjacent packing material, at the same time they provide enough flexibility and clearance so that lantern rings can be formed to fit around small diameter shafts without snapping.

Moreover, the successful removal of the lantern ring by the aforementioned corkscrew packing puller is virtually assured due to the probability that the pointed end of the corkscrew will land in a slot between adjacent outwardly-projecting lands. The result is the removal of the lantern ring without damage.

Additionally, for large diameter shafts, when the subject lantern ring and associated packing are provided in a stuffing box around a rotating shaft, and the gland of the stuffing box is tightened down against the packing material, the packing material adjacent the relatively open slotted structure at the outside of the ring projects into the lantern ring. Unlike the situation with the Heinz ring where the user is directed to position the continuous lands of the ring to the outside, here, with the open slot structure to the outside, the packing rings adjacent both sides of the lantern ring are locked to the lantern ring via projection into the slots. Other packing rings are also effectively locked to the lantern ring by friction with adjacent rings. The resulting sandwiched and locked ring structure is prevented from rotating due to the frictional contact with stationary containment elements of the packing ring set, such as gland, stuffing box and the bottom of the stuffing box. The lantern ring is thus prevented from rotating by virtue of the increased frictional force of this locked-together structure against the inside wall or bore of the stuffing box. The projection of material from adjacent packing rings into the open slotted structure of the subject packing ring is what prevents lantern ring rotation whenever shaft contact is made.

While in the past, there have been packing rings adjacent a lantern ring having intermittent outer lands, this packing orientation was never authorized for large diameter shafts. The result is that, in practice, prior lantern rings were never oriented so that the packing rings could stop the lantern ring rotation associated with contact to large diameter shafts.

Thus, the subject universal seal cage lantern ring comprises in general a linear flexible material formed in an I-beam configuration, with intermittent channels to either side of the body web, and with the intermittent channels being formed by intermittent lands formed by slotting the I-beam flanges. The spaces between the intermittent lands provide fluid slots, whereas additional holes for fluid flow can be provided through the web itself in terms of apertures through the web. The lantern ring wraps around a shaft, with flexibility provided by the continuous flexible web and the double-sided slotted structure either side of the web. Water or other fluid can be made to flow through the fluid slots and other fluid indentations to the shaft. The lantern ring is cut to appropriate length from a continuous roll of material such that the cut off piece can be wrapped around the shaft to form the lantern ring. In one embodiment the lantern ring is made from polytetrafluoroethylene to assure reasonable flexibility while at the same time providing sufficient rigidity to lock adjacent packing rings in place. The polytetrafluoroethylene is also utilized so as not to score the shaft around which the lantern ring is wrapped when shaft contact occurs. Additionally, the polytetrafluoroethylene provides a wide range of chemical resistance and is suitable for use over a large temperature range, −400° F. to +500° F. A lantern ring can be made from nylon, glass filled PTFE, glass filled nylon, polyethylene or polypropylene, depending upon temperature range and chemical resistance required.

BRIEF DESCRIPTION OF THE DRAWINGS

These and other features of the Subject Invention will be better understood in conjunction with the Detailed Description taken in conjunction with the Drawings of which:

FIG. 4 is a side view of a portion of the subject lantern ring indicating intermittent lands to either side of a central web;

FIG. 5 is a cross sectional view of the lantern ring of FIG. 4 taken along section lines 5—5, also indicating the possibility of providing a hole through the central web of the lantern ring;

FIG. 6 is a diagrammatic illustration of a section of the subject double-sided slotted land structure for a lantern ring showing the section through a transverse fluid hole;

FIG. 7 is a diagrammatic illustration of the anti-rotational securing of adjacent packing rings to the lantern ring through the projection of packing material into the slots provided by the interstices between the outer intermittent lands of the subject ring;

DETAILED DESCRIPTION

Figure 1:
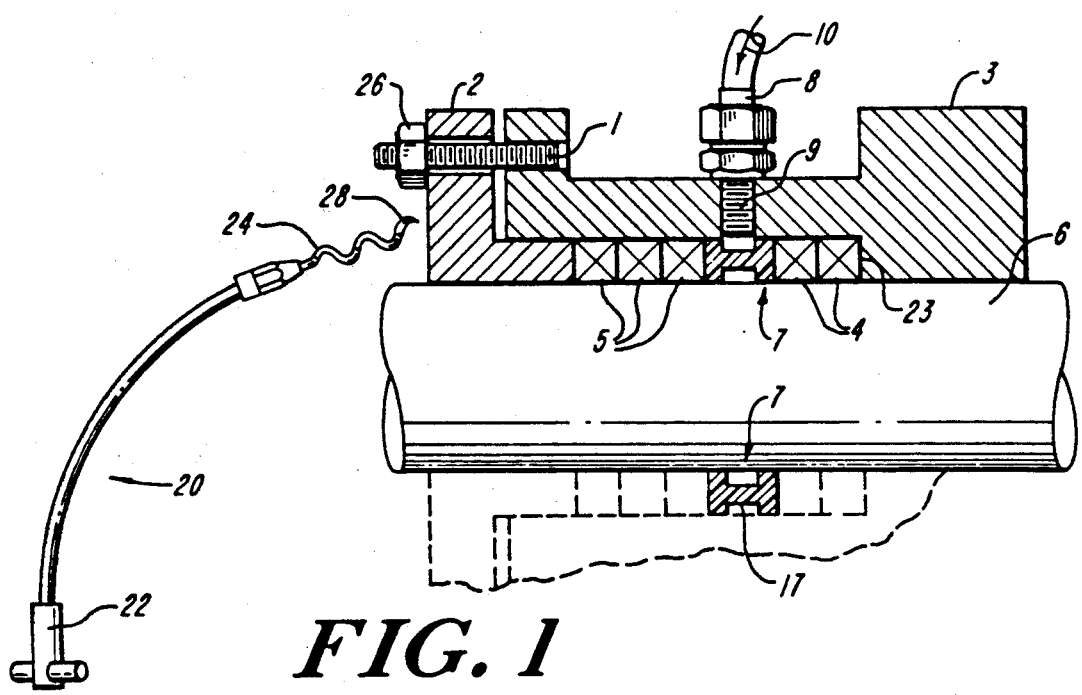
FIG. 1 is a sectional and diagrammatic illustration of the utilization of a lantern ring in a stuffing box in which the lantern ring is surrounded by packing rings.

Referring now to FIG. 1, a lantern ring 7 is shown in its proper position with a stuffing box casing 3 around a shaft 6. Inner packing rings 4 appear to one side of lantern ring 7, whereas outer packing rings 5 are illustrated as being Positioned to the other side of the lantern ring. A nut 26 is threaded onto a stud 1 permitting movement of the packing follower or gland 2 towards the end 23 of stuffing box or casing 3. The lantern ring is located under a fluid inlet hole 9 and fluid inlet nipple 8 through which water 10 or other fluid flows. The rotating shaft 6 of the machine is also shown. In general, the intermittent land/continuous land lantern ring mentioned hereinabove includes an intermittant channel and a continuous channel, with intermittant lands to either side of a solid body web 17.

Also shown is a puller generally indicated by reference character 20 to include a handle 22 and a corkscrew type end 24 having a tip 28. When it is desired to remove the packing and the lantern ring, this end 28 is inserted into the outer surface of packing 5, with gland 2 having been removed.

It is only with difficulty that the lantern ring 7 can be removed without damage due to the piercing of a continuous land of the packing ring by tip 28 when the packing ring is mounted in its normal orientation with the continuous lands at the outside of the packing ring. This orientation is shown in FIG. 2.

Figure 2:
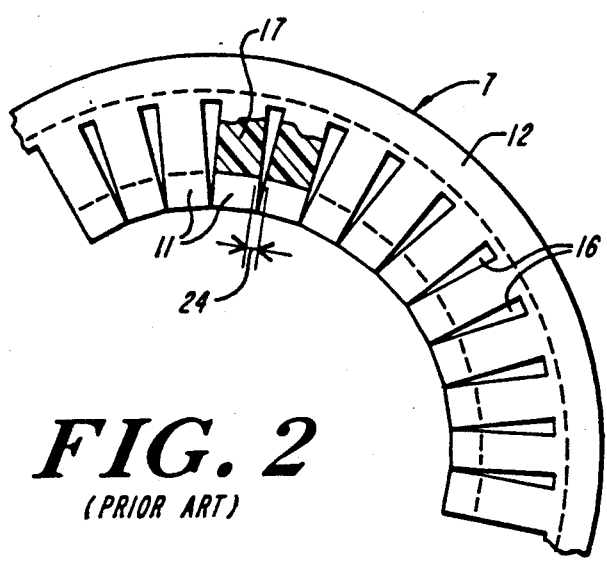
FIG. 2 is a side and cross sectional view of a prior art lantern ring showing a continuous land/intermittent land structure, in which the lantern ring is directed to be wound about a large diameter shaft, with the intermittent lands positioned towards the shaft.

With respect to prior lantern ring systems, as shown in FIG. 2, one is directed to orient the intermittent land/continuous land lantern ring with intermittant lands 11 to the inside, and continuous lands 12 to the outside of the ring. Thus ring 7 includes intermittent lands 11 and continuous lands 12, with intermittent lands having slots 16 therebetween and with the intermittent and continuous lands to either side of a solid body web 17.

What will be apPreciated from this Figure is that this is the normal orientation of the ring for both small and large diameter shafts, with continuous lands 12 existing to the outer side of the lantern ring. It is also this orientation which is used exclusively for large diameter shafts. It will be seen that there are no intermittent lands at the outside of the ring to permit the aforementioned packing/lantern ring interlocking or ring removal.

Figure 3A:
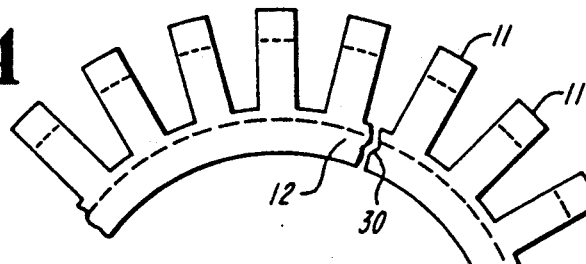
FIG. 3A is a diagrammatic illustration of the lantern ring of FIG. 2 mounted backwardly in an attempt to accommodate small diameter shafts, such that the continuous lands lie adjacent a small diameter shaft, showing snapping when such a packing ring is formed around the small radius.

In FIG. 3A, the same lantern ring when put on backwards to accommodate small diameter shafts provides that the continuous lands 12 be adjacent the shaft. This orientation is used exclusively for small diameter shafts in an attempt to obtain sufficient flexibility so that the ring can be wound about a small radius. As will be seen this attempt largely fails because the ring snaps or breaks.

To be more specific, in the orientation shown in FIG. 3A, when such a 5/16" cross-section lantern ring is to be wrapped around a small diameter shaft such as a ⅜" diameter shaft, the ring is formed by bending it around the small radius. This often causes fracture or snapping of the continuous land as illustrated diagrammatically at 30, such that when the lantern ring is hastily formed, the continuous lands crack. If the hastily formed ring is not immediately broken, when it is mounted in a stuffing box and tightened, the ring can snap at the fracture making it unreusable.

Figure 3B:
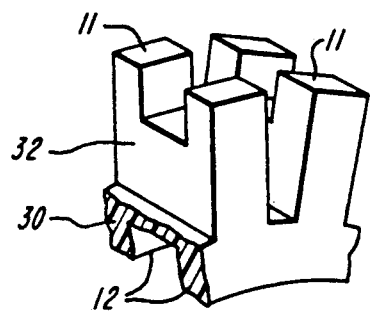
FIG. 3B is a cross sectional and diagrammatic illustration of the snapping of the lantern ring of FIG. 3A indicating the cause of the breakage to be the relative inflexibility or lack of compressability of the continuous lands.

Referring to FIG. 3B, regardless of when the break occurs, break 30 occurs at the continuous land 12, as opposed to at either an intermediate land 11 or web 32 due to the inflexibility or lack of elasticity of the continuous land structure, especially when made of PTFE.

Referring now to FIG. 4, in order to solve the above-mentioned problems, the subject lantern ring 40 is given an I-beam like structure having a flexible web portion 42 and intermediate lands 44 to both sides of the web. In one embodiment the lands to either side of the web are formed by cutting through the flanges of a machined or extruded I-beam type structure made of PTFE such that the resulting intermittent lands are rectilinear in configuration. Their shape is shown in connection with FIG. 5, in which lands 44 are formed in the flanges of the I-beam, whereas web 42 is clearly shown.

While the I-beam configuration includes a web and right-angled flanges to form a rectilinear channel between the flanges, this channel can have curved walls in a U-shaped cross-sectional configuration; or, can be V-shaped. Moreover, the numbers of intermittent lands on either side of the web may differ.

It will also be appreciated that web 42 may be provided with an aperture shown by dotted lines 46 in FIG. 5, and at 46' in FIG. 6. Note that the structure shown in FIG. 6 may be readily wrapped around even the smallest diameter shaft due both to the flexibility and clearance provided by the double-sided slotted structure of the lands to either side of the web. Because of the width of the slots, when formed around a small radius, the inner lands are permitted to touch at their inner peripheries which gives the ring the required clearance for small diameter shafts. Aperture 46 assures that fluid can pass from one side of the web to the other, such that the inflow of fluid can be provided through the web to the interior side of the web. The size of the lantern ring is the cross-sectional height and is designated L which is half of difference between inside and outside diameters when the ring is in place. The typical size of a lantern ring is ⅜ inch for a larger size shaft and 5/16 for a small size shaft.

Figure 8:
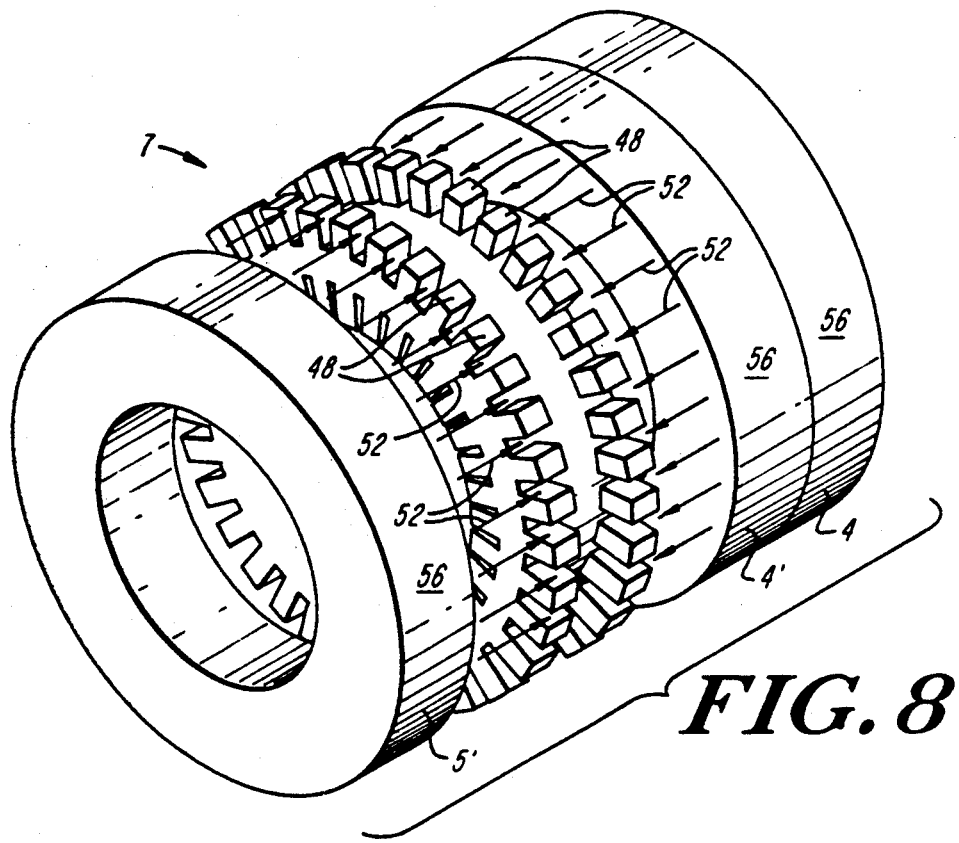
FIG. 8 is an exploded view of the locking process illustrated in FIG. 7 in which the packing/ring lantern ring structure is illustrated; and, FIG. 9 is a diagrammatic illustration of the utilization of a corkscrew type lantern ring puller, illustrating that the sharpened tip or end of the corkscrew generally lands in a slot between adjacent outer intermittent lands of the subject packing ring, the angular attack angle being necessitated by the obstructions created by the pump frame containing the stuffing box.

Referring now to FIG. 7, shaft 6 is shown as being Provided with packing ring 5' to the left hand side of lantern ring 7 and packing ring 4' to the right hand side. Here it can be seen that rings 4' and 5' have portions 50 projecting into the slots between adjacent lands 44, which lands are at the outside of the ring. It will be appreciated that due to the projection of the packing material into the slots 48 between outer lands 44, rings 4' and 5' are locked to lantern ring 7. This situation can be more readily seen in connection with FIG. 8 in which an exploded diagram shows that adjacent rings 4' and 5' have material which projects into interstices or slots 48 of the subject lantern ring as illustrated by arrows 52. As mentioned before, since the rings adjacent the lantern ring are mechanically clamped to the lantern ring, the likelihood of rotation of the lantern ring is minimized due to the frictional contact of the outer surfaces 56 of adjacent packing rings 4' and 5' with the inner surface or bore of the stuffing box.

Figure 9:
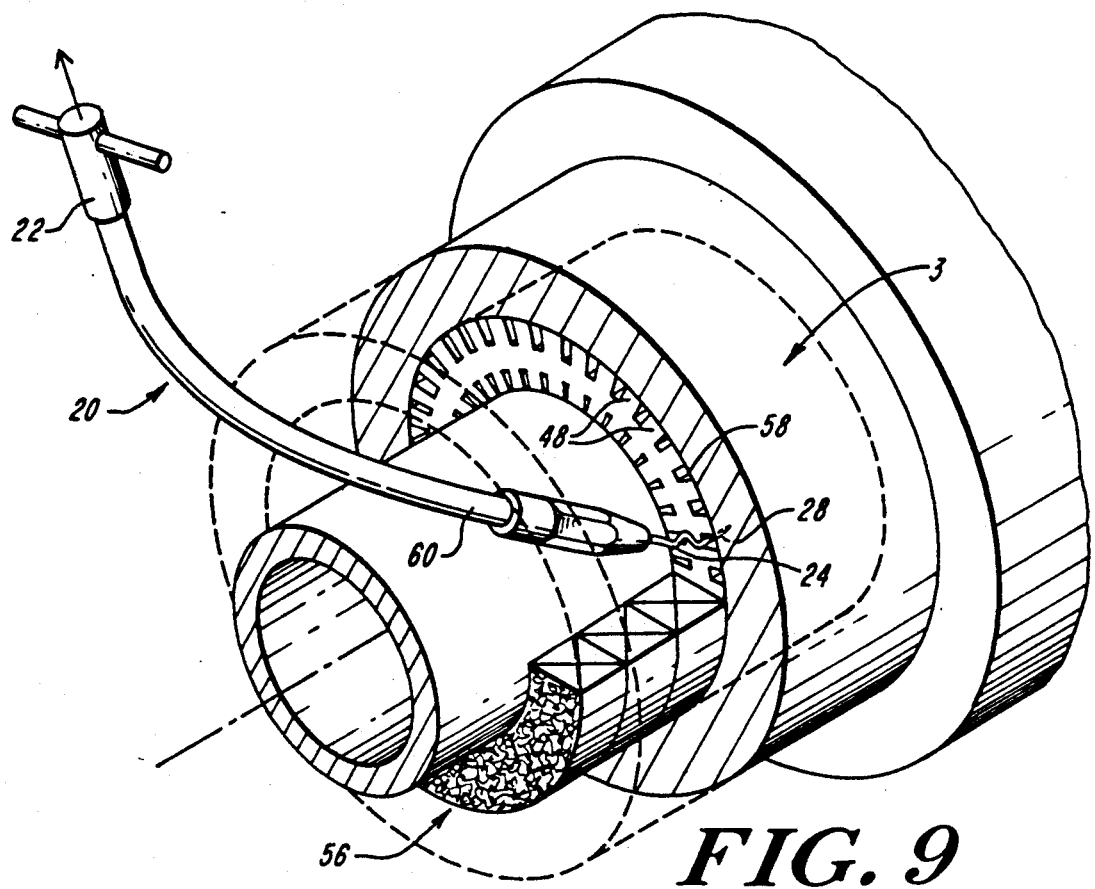

Referring now to FIG. 9, it will be appreciated that it is oftentimes desirable to remove the packing ring from the stuffing box and this is accomplished through the aforementioned corkscrew type structure known as a packing ring puller. The orientation of the subject lantern ring when wound around a shaft is as illustrated, in which the slots 48 are enlarged at the point where they contact inner surface 58 of stuffing box 3. What occurs in this embodiment is that the path of the corkscrew generally illustrated at 60 is along the inner wall or bore 58 of the stuffing box which results in the tip or end 28 of corkscrew 24 preferentially residing between the outer lands of the subject lantern ring. This being the case the lantern ring may be removed without piercing a continuous land of the prior art lantern ring when it is mounted its normal orientation as illustrated in FIG. 2.

In summary, regardless of the initial angle of attack of the corkscrew, the corkscrew tip tends to migrate toward the wall of the stuffing box. With the subject lantern ring being Provided with intermittent lands at the outer portion thereof, it has been found that close to 90% of lantern rings can be removed from the stuffing box after usage, without any damage which prevents their reuse.

Thus lantern rings made with intermittent lands to either side of a central web provide not only the flexibility and clearance necessary to prevent snapping upon installation, and not only provide for interlocking to prevent lantern ring rotation, the subject configuration also lends itself dramatically to the ease of removal of a lantern ring without damage during the removal process, making it a re-usable device. Note, the lantern ring may be formed in a continuous I-beam type extruded structure of PTFE with the slots being readily made through a sawing or grooving operation from both sides of the central web.

Having above indicated a preferred embodiment of the present invention, it will occur to those skilled in the art that modifications and alternatives can be practiced within the spirit of the invention. It is accordingly intended to define the scope of the invention only as indicated in the following claims:

I claim:

1. A lantern ring for use with packing to provide for the distribution of fluid to adjacent packing material about a shaft having an axis, comprising:
   a length of flexible material having opposed ends defining the extent of said length, said length being formed into an annulus so that said opposed ends are juxtaposed unslotted seb, said web having opposed axially facing portions, each portion having an inner diameter and outer diameter, each portion at its respective inner and outer diameter having lands extending radially therefrom, said lands having radially extending slots therein.

2. The lantern ring of claim 1 wherein said ring is made of PTFE.

3. The lantern ring of claim 1 wherein said structure is made of an elongated piece of material from which a suitable length ring can be cut.

4. The lantern ring of claim 1 and further including apertures through said web.

5. A length of material for bending into an annulsus to form a lantern ring, said material comprising a flexible structure, said structure having a longitudinal extent defined between two longitudinally spaced opposed ends, said ends adapted to be juxtaposed to each other informing said lantern ring, said longitudinal extent being further defined by a central, unslotted and continuous web from one end to the other end of said extent, said web having longitudinally running spaced apart edges and opposed top and bottom portions, said web having opposing lands extending from each side of said web upwardly and downwardly from each respective top and bottom portion of said web at each respective edge of said web, said lands having slots therethrough.

* * * * *

UNITED STATES PATENT AND TRADEMARK OFFICE
CERTIFICATE OF CORRECTION

PATENT NO. : 5,013,053
DATED : May 7, 1991
INVENTOR(S) : George B. Champlin

It is certified that error appears in the above-indentified patent and that said Letters Patent is hereby corrected as shown below:

Claim 1, column 6, line 56, change "unslotted seb" to

-- to each other --.

Signed and Sealed this

Eighteenth Day of April, 1995

BRUCE LEHMAN

*Commissioner of Patents and Trademarks*

*Attest:*

*Attesting Officer*